Feb. 19, 1929.   1,702,593
R. E. PIERCE
EXPANSIBLE JOINT FOR LININGS OF FABRIC BAGS
AND TUBES AND METHOD OF MAKING SAME
Original Filed Feb. 7, 1927    2 Sheets-Sheet 1
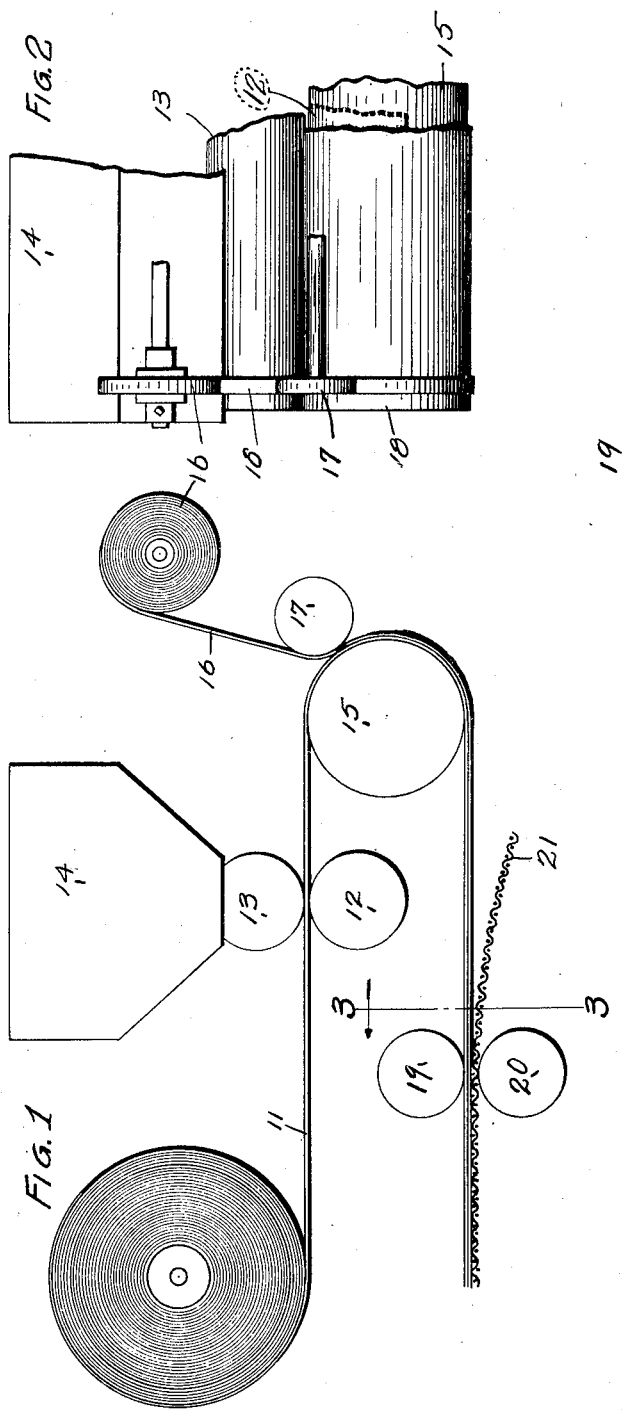
INVENTOR
ROBERT E. PIERCE
ATTY.

Feb. 19, 1929. 1,702,593
R. E. PIERCE
EXPANSIBLE JOINT FOR LININGS OF FABRIC BAGS
AND TUBES AND METHOD OF MAKING SAME
Original Filed Feb. 7, 1927  2 Sheets-Sheet 2
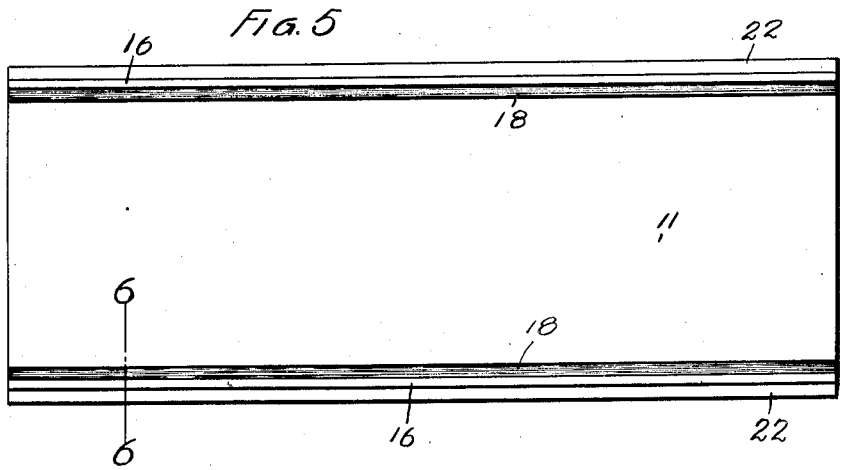
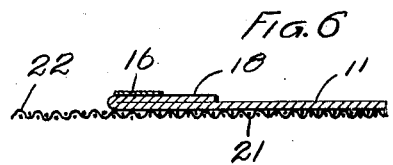
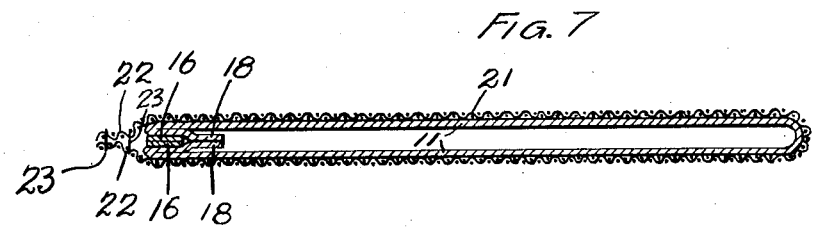
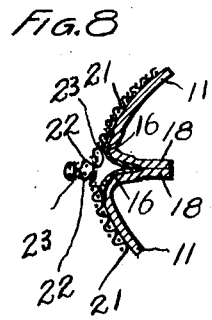
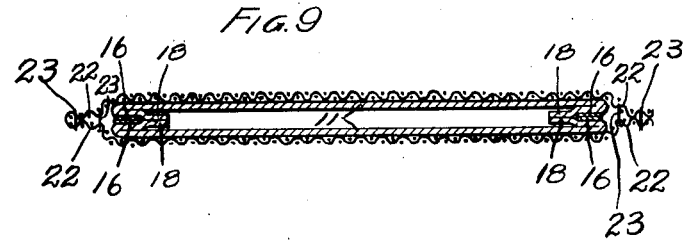
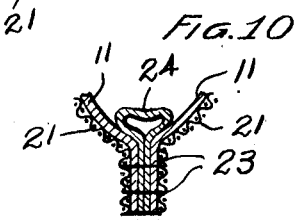
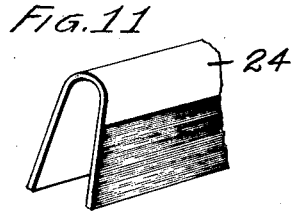
INVENTOR
ROBERT E. PIERCE
BY Edward E. Lingan
ATTY.

Patented Feb. 19, 1929.

1,702,593

UNITED STATES PATENT OFFICE.

ROBERT E. PIERCE, OF ST. LOUIS, MISSOURI, ASSIGNOR TO BEMIS BRO. BAG CO., OF ST. LOUIS, MISSOURI, A CORPORATION OF MISSOURI.

EXPANSIBLE JOINT FOR LININGS OF FABRIC BAGS AND TUBES AND METHOD OF MAKING SAME.

Application filed February 7, 1927, Serial No. 166,462. Renewed December 19, 1928.

My invention relates to improvements in expansible joints for linings of fabric bags and tubes and method of making same, and has for its primary object an expansible joint, which is so constructed that when the lining is in position within a fabric bag or tube the joint can readily expand, permitting the lining to snugly fill out the entire interior of the bag or tube and without danger of rupturing the lining.

A further object is to make an expansible joint for linings of fabric bags and tubes in which the lining is secured to the fabric by means of an adhesive, the joint also being made by means of this adhesive, a portion of the joint being provided with a non-adhesive zone so that the lining can readily expand and fill out the entire interior of the bag or tube and the bag or tube will take all of the strain, and danger of rupturing the lining is eliminated.

A further object is the method of making expansible joints for the aforementioned purpose in which one face of the lining is covered completely with an adhesive either non-drying or slow-drying, the adhesive surface being provided with a non-adhesive zone parallel to its edges so that when the lining is formed into a tube only that portion of the lining on the outside of the non-adhesive zone will be secured together by the adhesive, the non-adhesive zone permitting ready expansion of the joint without in any way loosening the pasted joint or placing undue stress on the lining during the expansion of the joint.

In the drawings:

Fig. 1 is a diagrammatic view showing one method of preparing my lining and securing it to the fabric, which is to form the casing of the tube or bag.

Fig. 2 is a fragmental end view of the same showing only one side.

Fig. 3 is an enlarged cross section taken on the line 3—3 of Fig. 1.

Fig. 4 is a diagrammatic view of a modified form of construction illustrating another manner of forming the non-adhesive zone.

Fig. 5 is a plan view of my structure showing the device ready to be formed into a tube or bag.

Fig. 6 is an enlarged cross section taken on the line 6—6 of Fig. 5.

Fig. 7 is an enlarged cross section of a tube in collapsed position, and before the same has expanded.

Fig. 8 is a fragmental view of the joint and casing showing the joint expanded.

Fig. 9 is an enlarged cross section showing one method of making a bag provided with a lining having my expansible joint.

Fig. 10 is a fragmental section of the lower portion of a bag when the same is made out of a tube; and Fig. 11 is a fragmental perspective view of the filler or welt employed.

In carrying out my method I employ a roll of paper or other flexible material 11. This paper or flexible material is passed between rolls 12 and 13, the roller 13 being in communication with a hopper 14, which contains an adhesive. This adhesive may be either slow-drying or non-drying as found desirable.

After passing between the rolls 12 and 13, one entire face of the material 11 is coated with the adhesive. The material is then passed over a roller 15, and simultaneously with the passing over this roller, a strip of paper or other flexible material 16 is applied to the adhesive surface, the strip 16 passing over the roller 17 which imparts sufficient pressure to cause the strip 16 to adhere to the adhesive coated surface.

The strip 16 forms a non-adhesive zone on the coated side of the material 11 and is spaced inward from each edge so as to leave an adhesive zone 18 on the outside of the non-adhesive zone, it being understood, of course, that an adhesive zone is formed along each edge of the material 11. After passing over the roller 15 the material 11 is passed between rollers 19 and 20. These rollers are of such length as to fit in between the two non-adhesive zones. Simultaneously with passing between the rolls 19 and 20 a body of woven material 21 passes between the rollers and is firmly pressed against the adhesive portion of the material 11 and between the non-adhesive zones so that, after the material has passed between the last mentioned rollers, the woven material 21 will have its edges 22 free and unattached to the material 11.

The edges of the material 11 including the strips 16 are folded over so as to rest on the non-adhesive side of the material 11 as illustrated in Fig. 6.

The fabric coated material is then either cut into suitable lengths or is folded longitudinally so as to form a tube. When cut into suitable lengths for making a bag, one end is folded over so that the edges 18 will adhere thus leaving the portions 22 of the fabric extending outward. The manner of forming the tube and also the bag are clearly shown in Figs. 7 and 9. The edges 22 of the woven body 21 are secured together by means of stitches 23 thus forming either the bag or tube.

I have found that in most bags or tubes, which are provided with a paper lining having a joint which is not readily expansible, it was necessary to sew very close to the joint of the lining in order to prevent the rupturing of the liner on account of it not being readily expansible, and frequently a slight deviation from a straight line caused the needle to perforate the lining, thereby rendering a bag or tube, which was to be air-tight or sift-proof, useless. By my improved joint, however, the seam or line of stitching can be at a safe distance from the joint in the lining because the lining can expand readily at the joint without any danger whatever of ruturing the lining.

When a bag is formed from a tube, it is necessary, in order to close the bottom, to insert a filler or welt 24 as illustrated in Fig. 10. This filler, as will be noted, flattens out and prevents leakage through the bottom seam.

As illustrated in Fig. 11 the filler or welt 24 is coated adjacent its two edges with an adhesive so that the same will stick to the lining 11. By employing this adhesive a sift-proof and air-tight joint is made.

In Fig. 4 I have shown a modified method of making the non-adhesive zone. In this construction a hopper 25 is employed, which is provided with a spout or nozzle 26, the opening in this nozzle being of the same width as the non-adhesive zone is intended to be. The hopper 25 is filled with talc or other dusting power, which will destroy the adhesiveness of the coating instead of using the strips 16, it being understood, of course, that this non-adhesive zone is to be parallel to and spaced apart from the edges of the adhesive coated material.

By my construction of joint I have evolved a flexible tube for mine ventilation, which can be cheaply constructed since it permits the use of a very loosely woven casing, such as jute and the like, which is used for gunny sacks, and, by reason of the lining, a tube constructed of this material will readily convey air for mine ventilating purposes. Heretofore it has been necessary to construct these tubes from closely woven material, similar to canvas, and to impregnate the material with some substance, which would render it practically non-porous, asphaltum being used in most cases. This made the tubing very expensive and heavy but, by the use of my improved joint for the lining, a very loosely woven outer casing can be employed in connection with a paper lining having my expansible joint thereby materially reducing the cost of such flexible piping and at the same time deliver the same efficiency, at least as it is delivered by the more expensive impregnated tubing aforementioned.

It will be noted from my construction that the joint comprises in-turned portions, only the inner edges of which portions are attached together, the remaining portions of the in-turned part of the seam constituting the non-adhesive zones, which zones are opposite each other so that the joint is free to expand without putting any strain on the adhesive or the material due to this expansion.

I may also, if desired, coat one face of the flexible material 11 with varnish, asphalt, shellac or like water-proof material, establish the non-adhesive zones adjacent the edges as previously described and, before the water-proofing material has dried, form my point that is by either making a tubular member or by making the construction illustrated in Fig. 9, this being preferable for lined water-proof bags. Then when the bag is filled, on account of the non-adhesive zones, a certain amount of expanding can take place in the sides of the bag depending entirely upon the width of the non-adhesive zones and the width of the folded over portions, and with this structure an expansible joint is readily obtained.

I may also, if desired, arrange the adhesive spreading roller 13 so that instead of spreading on adhesive completely across the face of the flexible material 11, a non-adhesive zone parallel to and spaced apart from the edges of the material will be left. In other words, the adhesive material will be applied to the flexible material 11 for a predetermined distance inward from its edges. Then a strip of said material of predetermined width will be left free of adhesive and then the remaining space, between these spaces free of adhesive, will also be coated with adhesive. This will eliminate the necessity of the strips of flexible material 16 or the dusting as illustrated in Fig. 4. This construction will accomplish the same purpose as accomplished by the structures described and without departing from the spirit of my invention.

It will be understood, of course, that the adhesive, with which the flexible material 11 is coated, may be either moisture-proof or sift-proof, or it may have both qualities.

Having fully described my invention, what I claim is:—

1. The method of making lined fabric bags and tubes which consists in coating one face of said lining with a non-drying adhesive, establishing a non-adhesive zone parallel to and spaced apart from the edges of said lining, attaching to said lining by means of said adhesive between said zones an outer fabric casing having its free edges unattached to said lining, folding said lining and casing so that the portion of the lining on the outside of said zones adhere together, and, lastly, stitching the free edges of the fabric casing together.

2. The method of making lined fabric bags and tubes which consists in coating one face of a sheet of flexible material with a non-drying adhesive, establishing on said coated face non-adhesive zones parallel to and spaced apart from the edges of said material, attaching to said adhesive sheet and between said nonadhesive zones a sheet of fabric so that its edges will be free and unattached, folding the edges of said material including the non-adhesive zones back upon the non-adhesive face of said flexible material, thereby leaving the edges of the fabric projecting beyond the lining and, lastly, folding said flexible material upon itself so that the adhesive edges and non-adhesive zones will overlie each other thereby creating a joint, a portion of which is readily expansible.

3. The method of making lined fabric bags and tubes which consists in coating one face of said lining with an adhesive, applying to said lining on its coated face strips of non-adhesive flexible material parallel to and spaced inwardly from each longitudinal edge thereof, folding said edges including the non-adhesive strips over on the non-adhesive surface of said lining, securing a fabric casing to said lining intermediate the nonadhesive strips so that the edges of the fabric casing will be free and unattached thereto, folding said lining upon itself so that the adhesive coated edges outside of said strips will be firmly united together, and lastly securing the free edges of said fabric together with stitches which do not pass through the lining.

4. The method of making lined fabric bags and tubes which consists in coating one face of a lining with an adhesive in such a manner that non-adhesive zones of predetermined width parallel to and spaced inwardly from the edges of said lining will be formed, folding the edges of said lining including said non-adhesive zones over on the nonadhesive face of said lining and simultaneously securing to the adhesive face of said lining a fabric casing of at least the same width as the lining and only between nonadhesive zones, then folding said lining upon itself so that the coated portions of the folded edges are joined together whereby the outer edge of said joint is non-adhesive and readily expansible, and then securing the edges of the fabric casing together by stitches.

5. A lining for fabric bags and tubes comprising a flexible piece of material coated on its outer surface with a nondrying adhesive, a nonadhesive zone adjacent and parallel to the edges of said flexible material so that said edges can be joined together thereby leaving a portion adjacent the adhesive edges free to expand, and a fabric casing secured to said lining by means of said adhesive coated face, said lining having its edges projecting beyond the nonadhesive zones and joined together by stitching which does not pass through the lining.

6. A lining for fabric bags and tubes comprising a piece of flexible material having an adhesive coating on one face, said material having its edges folded over and secured together by said adhesive while moist, a strip along said edges and spaced inwardly therefrom being rendered nonadhesive so that said joint can expand and the nonadhesive portion will not stick together while said adhesive is still moist, and a fabric casing secured to said lining by said adhesive while still moist, the longitudinal edges of said fabric being free and unattached from said lining and secured together by stitches which do not pass through the lining.

7. A lining for fabric bags or tubes comprising the combination with an outer woven fabric member formed by stitching its edges together, of a lining having an adhesive surface secured within said member by said adface so as to have its meeting edges adjacent the stitching free and unattached to said fabric member, a nonadhesive zone formed on said lining parallel to the free edges of said outer member, the free edges of the lining being turned inwardly and attached to each other by said adhesive so that said non-adhesive zones will be opposed to each other thereby forming a joint adjacent the stitching of the outer member, which can be readily expanded without placing any strain on the lining or on the adhesive uniting the edges thereof.

8. A lining for fabric casings comprising an adhesive coated flexible member, the edges of which are in-turned and united together to form a joint, means for rendering an outer defined portion of said joint non-adhesive so that the same can expand without placing any strain on said flexible member or the adhesive connection of said joint, and a fabric casing secured to said member by said adhesive, the outer edges of which casing are secured together by stitches which do not pass through the lining.

9. A lining for fabric bags or tubes comprising a sheet of sift proof material having a relatively slow drying water proof coating on one face, which coating is adhesive while moist, a nonadhesive zone formed on said coated face and spaced inwardly from and parallel to the longitudinal edges of said sheet, said edges being inturned and attached to each other by said coating while moist so that the nonadhesive zones will be opposed to each other whereby a water proof lining having expansible longitudinal edges is formed.

In testimony whereof I have affixed my signature.

ROBERT E. PIERCE.